(12) United States Patent
Stoffel et al.

(10) Patent No.: US 8,128,139 B2
(45) Date of Patent: Mar. 6, 2012

(54) VEHICLE BUMPER AND MOUNTING BRACKET ASSEMBLY FOR A LAMP

(75) Inventors: Christopher J. Stoffel, Powell, OH (US); Nick A. Massaro, Dublin, OH (US); Steven U. Behm, Hilliard, OH (US)

(73) Assignee: Honda Motor Co., Ltd., Tokyo (JP)

( * ) Notice: Subject to any disclaimer, the term of this patent is extended or adjusted under 35 U.S.C. 154(b) by 472 days.

(21) Appl. No.: 12/187,123

(22) Filed: Aug. 6, 2008

(65) Prior Publication Data
US 2010/0032971 A1  Feb. 11, 2010

(51) Int. Cl.
*B60R 19/04* (2006.01)
(52) U.S. Cl. ......... 293/117; 293/155; 362/549; 362/546
(58) Field of Classification Search .............. 293/117, 293/155; 362/549, 546
See application file for complete search history.

(56) References Cited

U.S. PATENT DOCUMENTS

| 3,625,796 | A   |   | 12/1971 | Graves |
|-----------|-----|---|---------|--------|
| 4,809,139 | A   |   | 2/1989  | Ryder et al. |
| 5,743,619 | A   |   | 4/1998  | Gerstner et al. |
| 5,803,578 | A   |   | 9/1998  | Madsen |
| 5,833,283 | A   | * | 11/1998 | Shaw ............................. 293/117 |
| 6,203,366 | B1  | * | 3/2001  | Muller et al. ................. 439/561 |
| 6,361,197 | B1  | * | 3/2002  | Katsumata et al. ........... 362/546 |
| 6,554,461 | B2  |   | 4/2003  | Yamada et al. |
| 6,939,029 | B1  |   | 9/2005  | Stahel et al. |

FOREIGN PATENT DOCUMENTS

JP   06-312633   11/1994

\* cited by examiner

*Primary Examiner* — Glenn Dayoan
*Assistant Examiner* — Melissa A Black
(74) *Attorney, Agent, or Firm* — Plumsea Law Group, LLC

(57) ABSTRACT

A vehicle bumper and mounting bracket assembly for a lamp is disclosed. The mounting bracket has a geometry that facilitates mating with flanges disposed on apertures on the bumper. The mounting bracket also includes resilient tab locks configured to receive tabs on the flanges. Ledges of the mounting bracket are used to attach a lamp that is held in cantilever relation with the bumper.

20 Claims, 13 Drawing Sheets

VEHICLE BUMPER AND MOUNTING BRACKET ASSEMBLY FOR A LAMP

BACKGROUND OF THE INVENTION

1. Field of the Invention

The exemplary embodiment of the invention relates to a vehicle bumper and mounting bracket assembly for a vehicle lamp such as a headlight that is designed to enable the mounting bracket and lamp to be inserted and integrated to the interior side of a flexible vehicle bumper.

2. Description of Related Art

The current trend in vehicle bumpers is to make them of flexible materials such as polypropylene to provide flexure and energy dissipation for minor impacts. Flexible bumpers are also lightweight and can be painted to either match or contrast with the color of the vehicle body. Such vehicle bumpers also provide wide latitude for vehicle designers. Energy dissipating bumpers are generally provided with apertures which are designed to be aligned with lamps such as headlights, foglights or tail lights that are mounted to the frame of the vehicle. There are two conventional methods of assembling the lamps with the bumpers. One method is to front mount, i.e., mount to the exterior of the bumper the lamp by providing a pocket feature within the bumper face to package the lens and housing of the lamp. A second method is to use a rear load mounting, i.e., to mount the lamp on the interior of the bumper by using a metal bracket and backside screw bosses.

In some vehicles, due to styling requirements the lamp apertures are smaller than the actual lamp housing so that the rear load mounting direction is dictated by the design. Typically rear load mounting leads to surface blemishes or sinks and deformations on the surface of the bumper due to structural features required to attach the metal bracket such as backside screw bosses or dog houses. To hide these blemishes, it is common to use an extra component such as a bezel on the exterior surface of the bumper around the lamp aperture. This adds another step to the assembly process as well as another part to be cataloged and stocked. In addition, the bezel may be contrary to the aesthetic appearance desired particularly in recent vehicles which have a sweep front bumper that is curved. The elimination of a bezel will also provide more design freedom in the curvature of that sweep.

Typical examples of prior art methods of attaching lamps to vehicles are described.

An example of a prior art method involves a modular light assembly for mounting decorative light strips to motorcycles or similar vehicles. A flange includes light support housing that is designed to surround and clip around a light assembly carrying an integrated circuit board. The flange is itself mounted to the motorcycle or vehicle.

Another example from the prior art is a vehicle lamp having arm-like brackets integrally formed with lamp body to mount the lamp to the vehicle body. The lamp body also includes additional bosses for replacement brackets of similar design should the original bracket need to be replaced. These brackets do not surround and support the lamp in a frame-like manner, and they fasten to the vehicle body by conventional fastening bolts and nuts.

A third prior art example is a head lamp mounting bracket that is attached in conventional ways to a vehicle support bracket. The vehicle support bracket is located forward of the radiator support and fastened thereto.

It is also conventional to provide a three point fastening system on the rear side of the bumper for a fog lamp assembly.

Another prior art fog lamp installation device uses a bumper stay to attach a fog lamp to a bumper. The bumper stay attaches to the bumper in a conventional way with a fastener.

There is therefore a need for a rear load mounting of a lamp assembly that can follow the contour of the bumper, and has the structural integrity to hold the lamp assembly in a cantilever relationship on the rear side of a flexible bumper without additional hardware. The elimination of the need for a covering bezel on the outer surface of the bumper also provides more design freedom and streamlined assembly. These features would facilitate manufacture, and enable more styling freedom.

SUMMARY

The exemplary embodiment is a rear load mounting bracket for a vehicle lamp with sufficient rigidity and structural integrity to be attached solely to a flexible vehicle bumper with only three tapping screws. The structure of the mounting bracket supports the cantilevered weight of the lamp assembly onto the flexible bumper without the need to attach the lamp assembly or the bracket to the frame of the vehicle. This greatly simplifies manufacture and greatly enhances styling freedom. The need for any covering or bezel to hide surface blemishes is completely eliminated. The mounting bracket of the exemplary embodiment is also equipped with a self-alignment feature to speed assembly of the bracket and lamp onto the bumper.

In one aspect, the invention provides a vehicle bumper assembly having a resilient bumper adapted to be attached to a vehicle body, the bumper having a bumper exterior surface and a bumper interior surface and a bumper aperture for a lamp. The bumper aperture is defined by a peripheral flange including a bumper screw boss formed thereon and an inwardly directed tab. The invention also includes a mounting bracket having a bracket exterior surface configured to abut and mate with the bumper interior surface, a bracket aperture aligned with the bumper aperture and presenting a ring-like frame for mounting the lamp in cantilever relation, the bracket having a screw aperture disposed to align with the bumper screw boss on the bumper, and a resilient tab lock disposed to align with and matingly receive the tab. The bracket also includes opposed integrally formed ledges extending inward, and a plurality of bracket screw bosses disposed along the ledges for mounting the lamp thereto.

In another aspect, the invention provides a vehicle bumper assembly having a resilient bumper adapted to be attached to a vehicle body, the bumper having a bumper exterior surface and a bumper interior surface and a bumper aperture for a lamp. The bumper aperture is defined by a peripheral flange including a screw boss formed thereon and an inwardly directed tab. The assembly also includes a mounting bracket for mounting the lamp having a bracket exterior surface configured to abut and mate with the bumper interior surface, the mounting bracket including a front face and an inward facing surface that is disposed at an angle to the front face. The mounting bracket further includes a bracket aperture that is disposed adjacent to the inward facing surface and a mating recess disposed between the bracket aperture and the inward facing surface. The peripheral flange is configured to insert into the mating recess and thereby mate the mounting bracket with the bumper.

In another aspect, the invention provides a vehicle bumper assembly having a resilient bumper adapted to be attached to a vehicle body, the bumper having a bumper exterior surface and a bumper interior surface and a bumper aperture for a lamp. The bumper aperture is defined by a peripheral flange. The assembly also includes a mounting bracket having a bracket exterior surface configured to abut and mate with the bumper interior surface, a bracket aperture aligned with the bumper aperture and presenting a ring-like frame for mounting the lamp in cantilever relation. The bracket also includes opposed integrally formed ledges extending inward; and the lamp is configured to mount to the ledges.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

For consistency and convenience, directional adjectives are employed throughout this detailed description corresponding to the illustrated embodiments and orientation with the point of reference being the vehicle itself. For example, the forward or front direction refers to the front of the vehicle, and the rearward or rear direction refers to the back of the vehicle. This is also true of the adjectives interior and exterior. For example, the interior refers to the side or face of a component that is oriented toward the interior or center of the vehicle; and the exterior refers to the side or face of a component that is oriented toward the outside of the vehicle. The adjectives right and left are employed from the point of the view of a driver or passenger in the vehicle. The adjectives medial and lateral are employed with reference to a longitudinal centerline through the vehicle. The medial being toward the centerline, and the lateral being toward the outer edge or away from the centerline.

Figure 1:
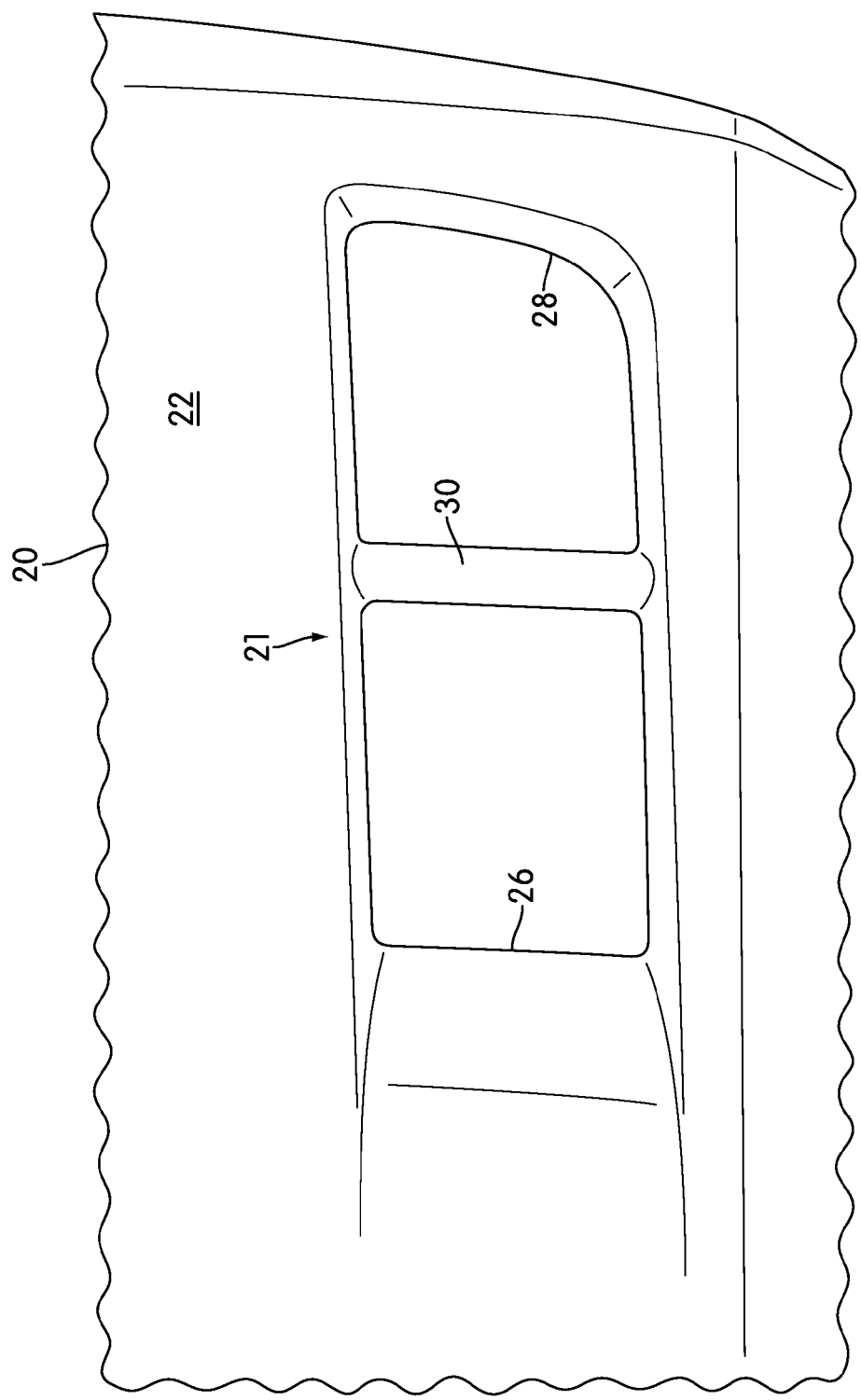
FIG. 1 is a front elevational view of a portion of the exterior surface of a vehicle bumper.
Figure 7:
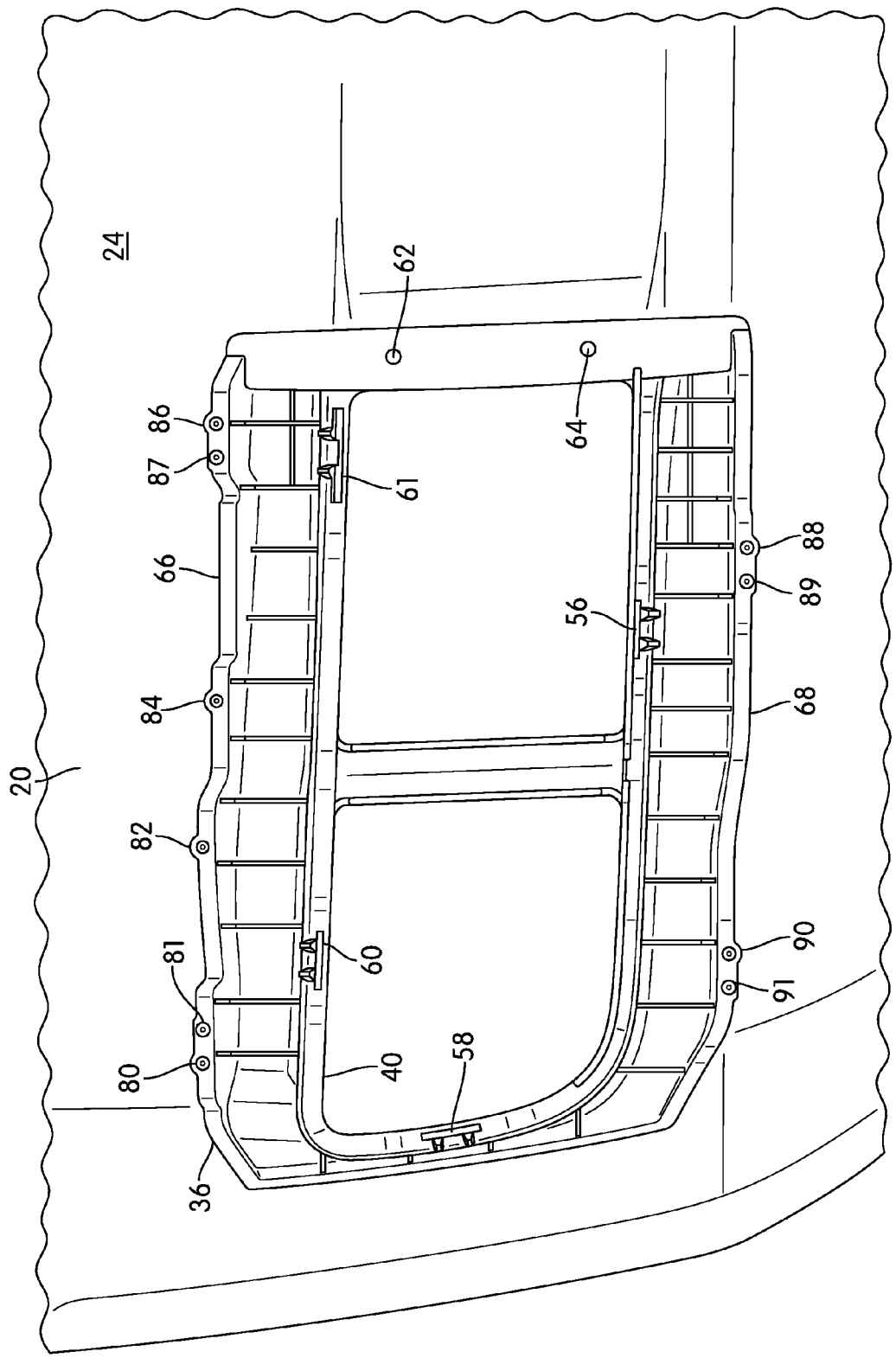
FIG. 7 is a rear elevational view of the interior side of the vehicle bumper with the mounting bracket in place.
Figure 8:
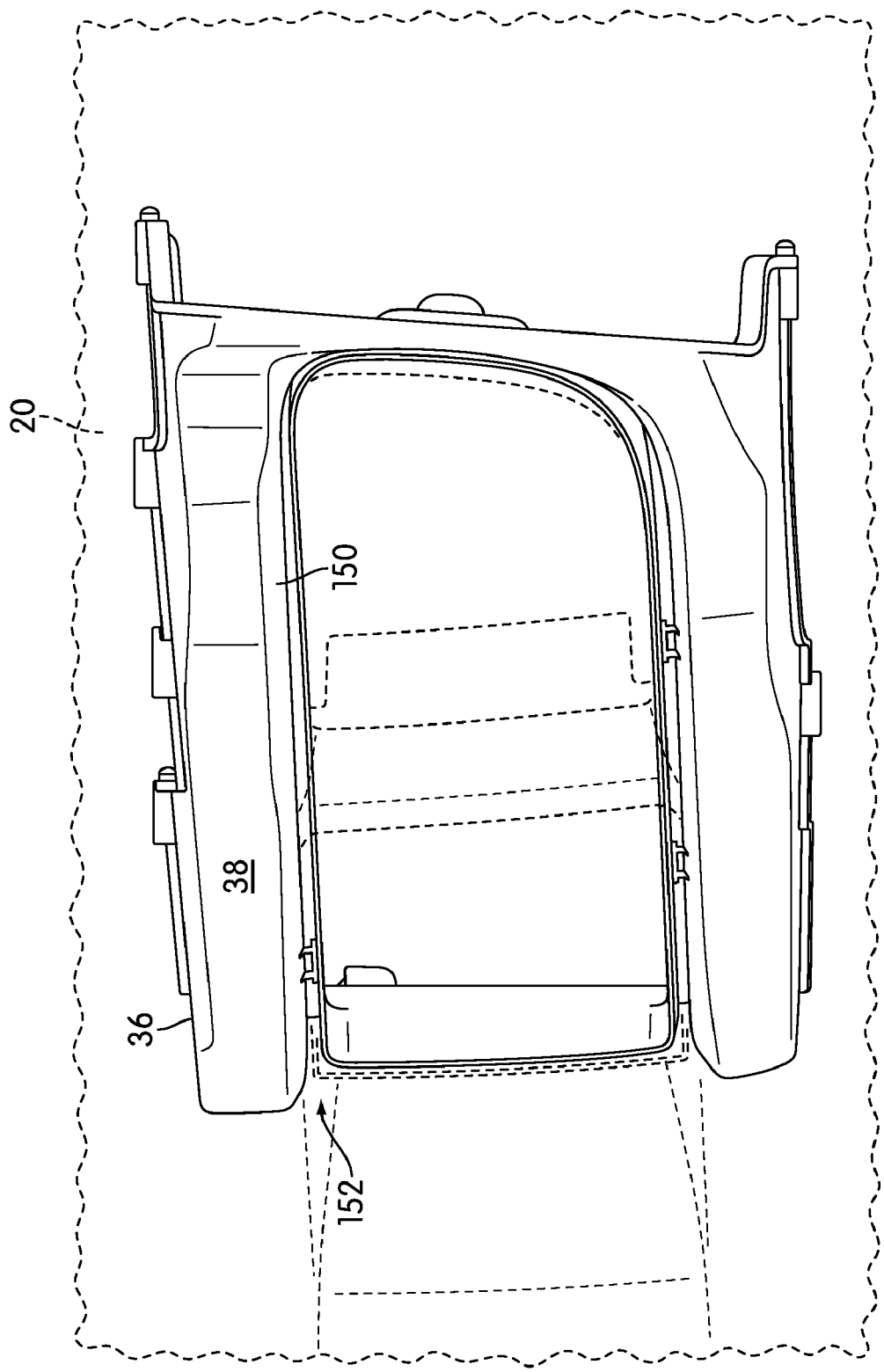
FIG. 8 is a lateral side view of the mounting bracket shown with the vehicle bumper in dashed lines.

For illustrative purposes a portion of a flexible vehicle bumper is depicted in FIGS. 1-6 in various stages of assembly with an exemplary embodiment of the mounting bracket for a vehicle lamp. FIG. 1 depicts the outside of the flexible bumper, in this embodiment designed with two apertures separated by a column for lamps such as head lamps, fog lamps or tail lamps or the like. The portion depicted in FIG. 1 is the left side of a front bumper. FIGS. 7-8 illustrate the mounting bracket arranged in place on the bumper with FIG. 7 showing the rear face, and FIG. 8 showing the front face with the bumper shown in phantom lines. FIGS. 9-13 illustrate various cross-sections and cross-sectional views of the mounting bracket.

Figure 2:
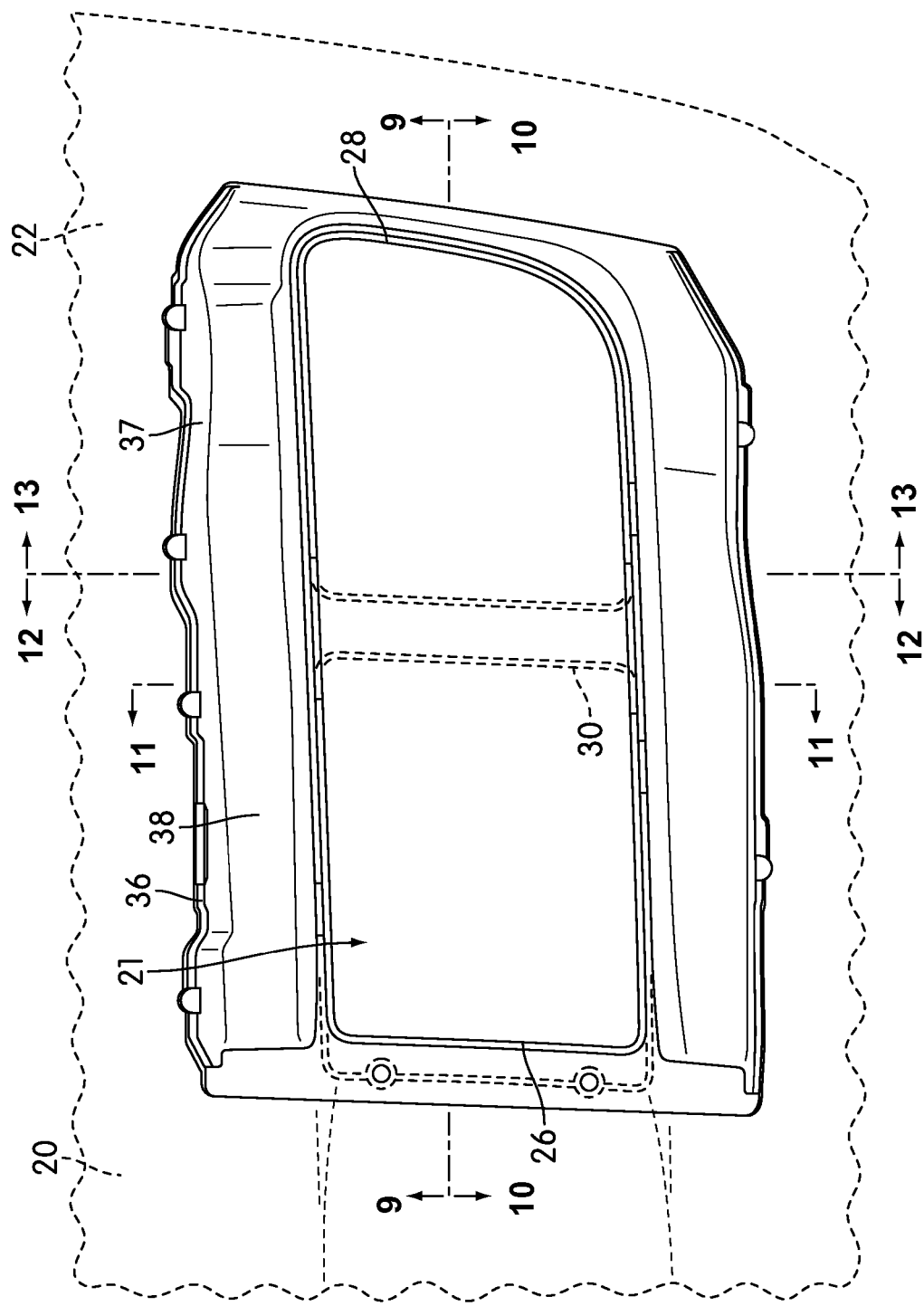
FIG. 2 is a front elevational view similar to FIG. 1, but with a hidden line showing of a mounting bracket fitted on the vehicle bumper.

Referring to FIGS. 1-6, bumper 20 is illustrated from both the front and rear. That is, FIGS. 1 and 2 illustrate bumper exterior surface 22; while FIGS. 3-6 illustrate bumper interior surface 24. Generally, bumper 20 could have any shape. In this exemplary embodiment, bumper 20 may have a sweeping or curved shape. The curvature of bumper 20 can be selected to reflect particular stylistic choices for a motor vehicle.

In this exemplary embodiment, each side of bumper 20 is provided with bumper aperture 21. In this case, bumper aperture 21 is a larger aperture that further comprises a set of smaller apertures, medial aperture 26 and lateral aperture 28 separated by column 30. On bumper exterior surface 22, the apertures and column are defined by styled surfaces. On bumper interior surface 24, best seen in FIGS. 4 and 5, medial aperture 26 is defined on the inside by medial flange 34 extending around medial aperture 26; and lateral aperture 28 is defined on the inside by lateral flange 32 extending around lateral aperture 28.

Figure 3:
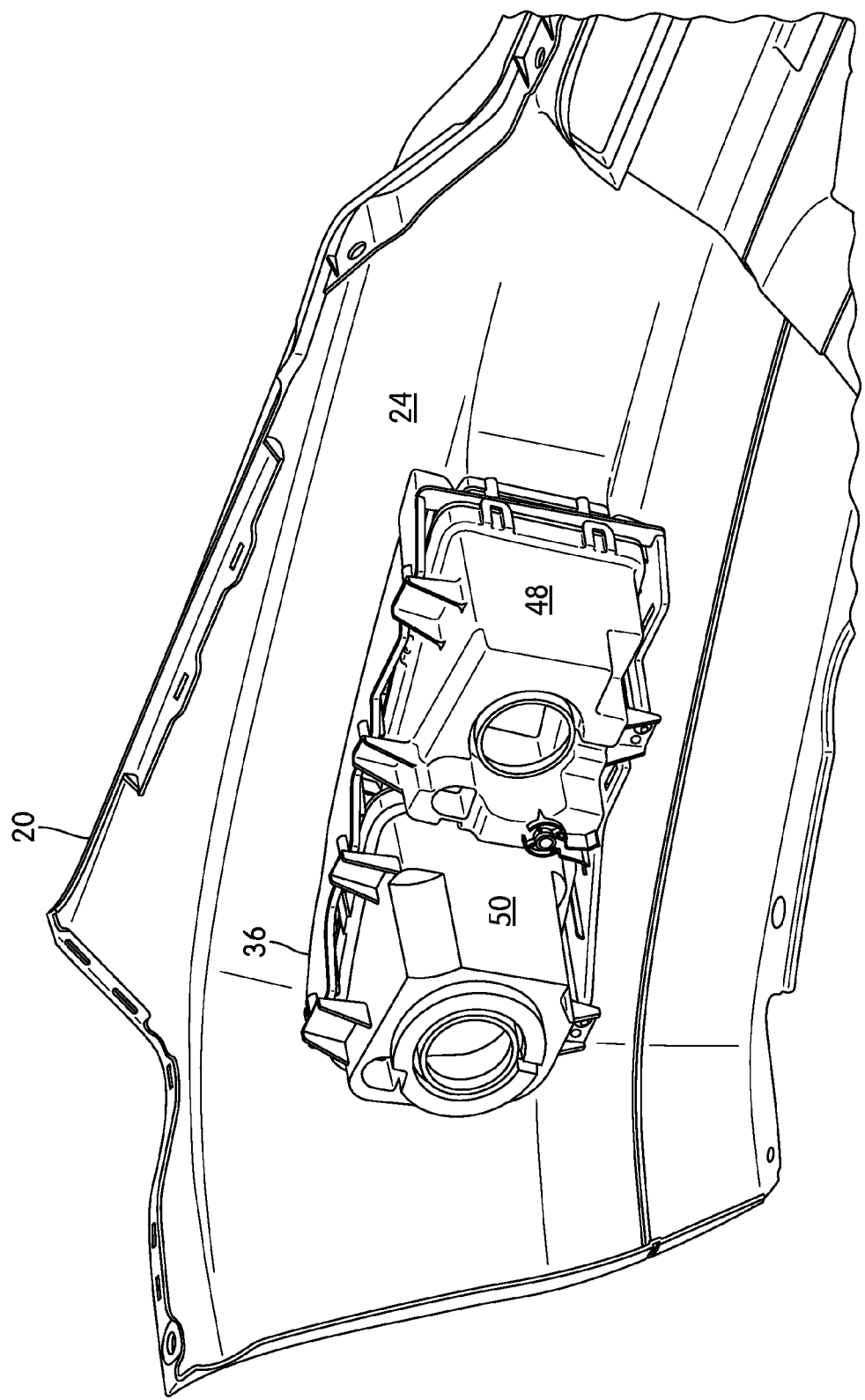
FIG. 3 is a perspective view of a portion of the interior side of the vehicle bumper, shown with a mounting bracket of the exemplary embodiment and a light assembly in place.
Figure 4:
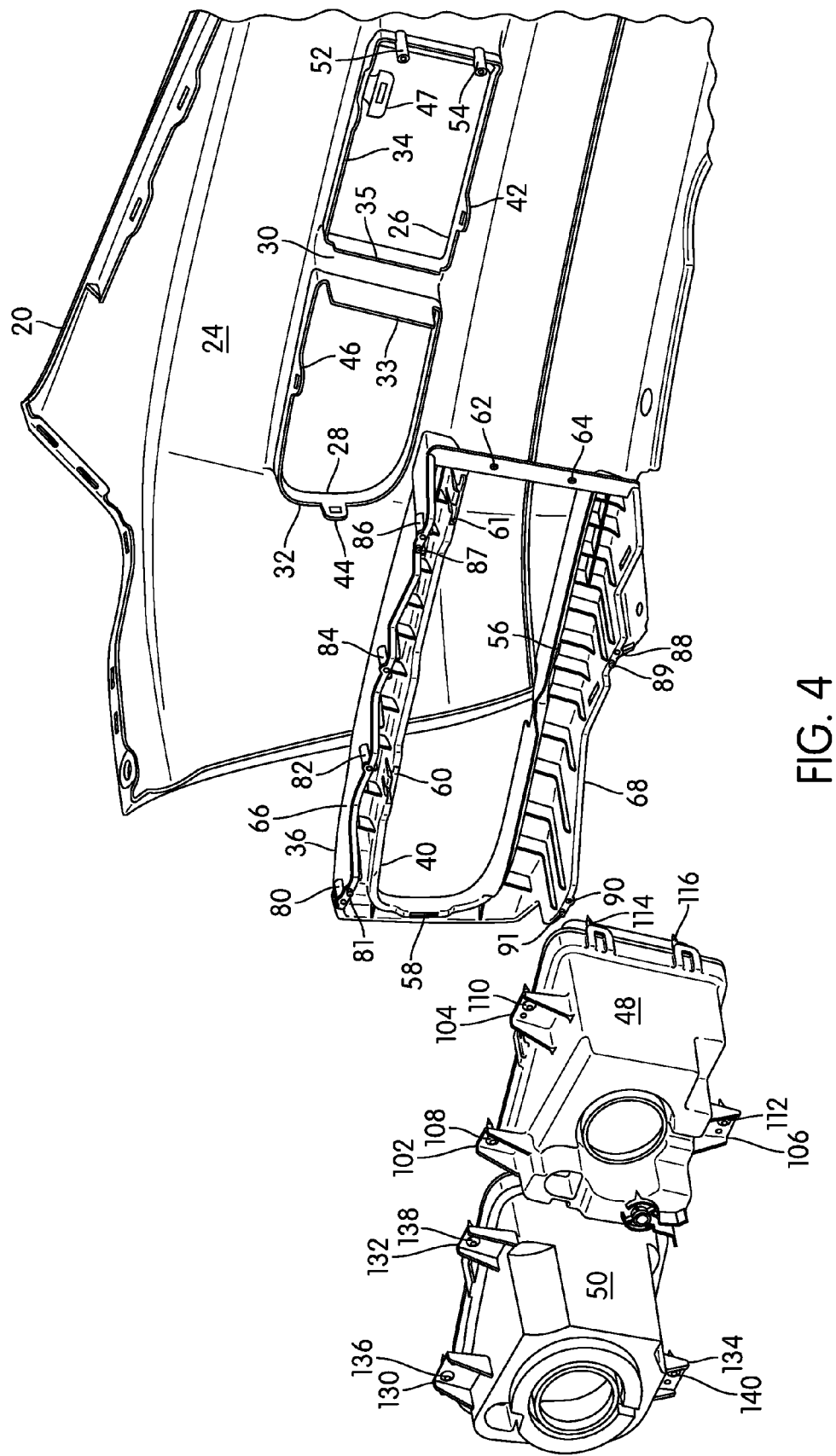
FIG. 4 is an exploded assembly view of the interior side of the vehicle bumper, the mounting bracket and light assembly.

Apertures in a bumper can be configured to receive various types of lamps that can provide light for a motor vehicle. In some cases, apertures can be configured to receive a headlamp. In other cases, apertures can be configured to receive a fog lamp. In this exemplary embodiment, medial aperture 26 and lateral aperture 28 can be configured to receive first lamp 48 and second lamp 50, respectively, as seen in FIGS. 3 and 4. In particular, first lamp 48 can be a fog lamp that is configured to provide lighting during foggy conditions. Second lamp 50 can be a headlamp that is configured to provide lighting during darkened road conditions. In other embodiments, however, only a single lamp may be provided. For example, in an alternative embodiment without a fog lamp, a plastic cover could be applied over medial aperture 26.

In some cases, medial aperture 26 and lateral aperture 28 can have a geometry that helps block light between adjacent lamps. In one embodiment, medial flange 34 can include first center portion 35 that extends inwardly from bumper 20. In a similar manner, lateral flange 32 can include second center portion 33 that extends inwardly from bumper 20. In some cases, first center portion 35 and second center portion 33 can be configured to cover the medial and/or lateral sides of lenses that may be associated with medial aperture 26 and lateral aperture 28, respectively. With this arrangement, first center portion 35 and second center portion 33 can help block light between adjacent lamps, such as a headlamp and a fog lamp.

In embodiments where the shape of a front bumper prohibits traditional front mounting methods for one or more lamps, a motor vehicle can include provisions for mounting lamps to an interior of a bumper. In one embodiment, a bumper can include a mounting bracket that is configured to mount one or more lamps to a bumper. In this exemplary embodiment, bumper 20 is associated with mounting bracket 36. In particular, mounting bracket 36 is attached to the inside of bumper 20 and closely fitted to the interior of bumper 20, as clearly seen in FIG. 2. Exterior surface 37 of mounting bracket 36 includes front face 38 that follows the contour of and rests against bumper interior surface 24. Mounting bracket 36 is shown in this exemplary embodiment with bracket aperture 40 whose boundary encompasses both medial aperture 26 and lateral aperture 28. That is, this embodiment of mounting bracket 36 does not have a column to correspond to central column 30. In other embodiments, however, mounting bracket 36 could include a column that corresponds to central column 30.

In some embodiments, a mounting bracket can have a geometry that facilitates attachment with a bumper. For example, in embodiments where apertures in a bumper are associated with inwardly extending flanges, a mounting bracket can include provisions for mating with the flanges. In particular, the mounting bracket can present a ring-like frame for mating with the flanges. This arrangement allows for an interior mounting arrangement that can reduce and/or eliminate the need for additional mounting components such as doghouses and can help reduce surface blemishes associated with various types of mounting components.

Figure 11:
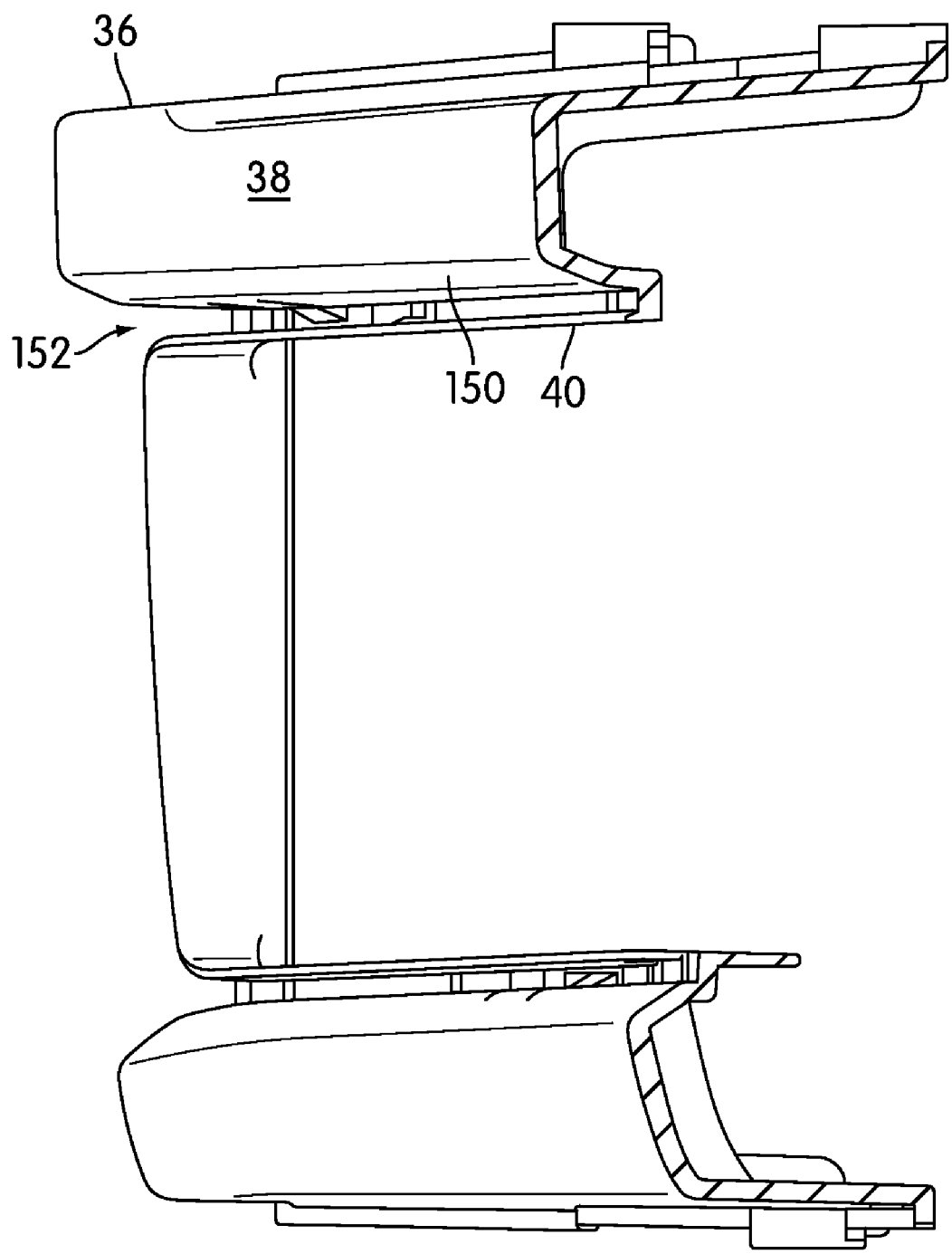
FIG. 11 is a cross-sectional view taken along line 11-11 in FIG. 2.
Figure 12:
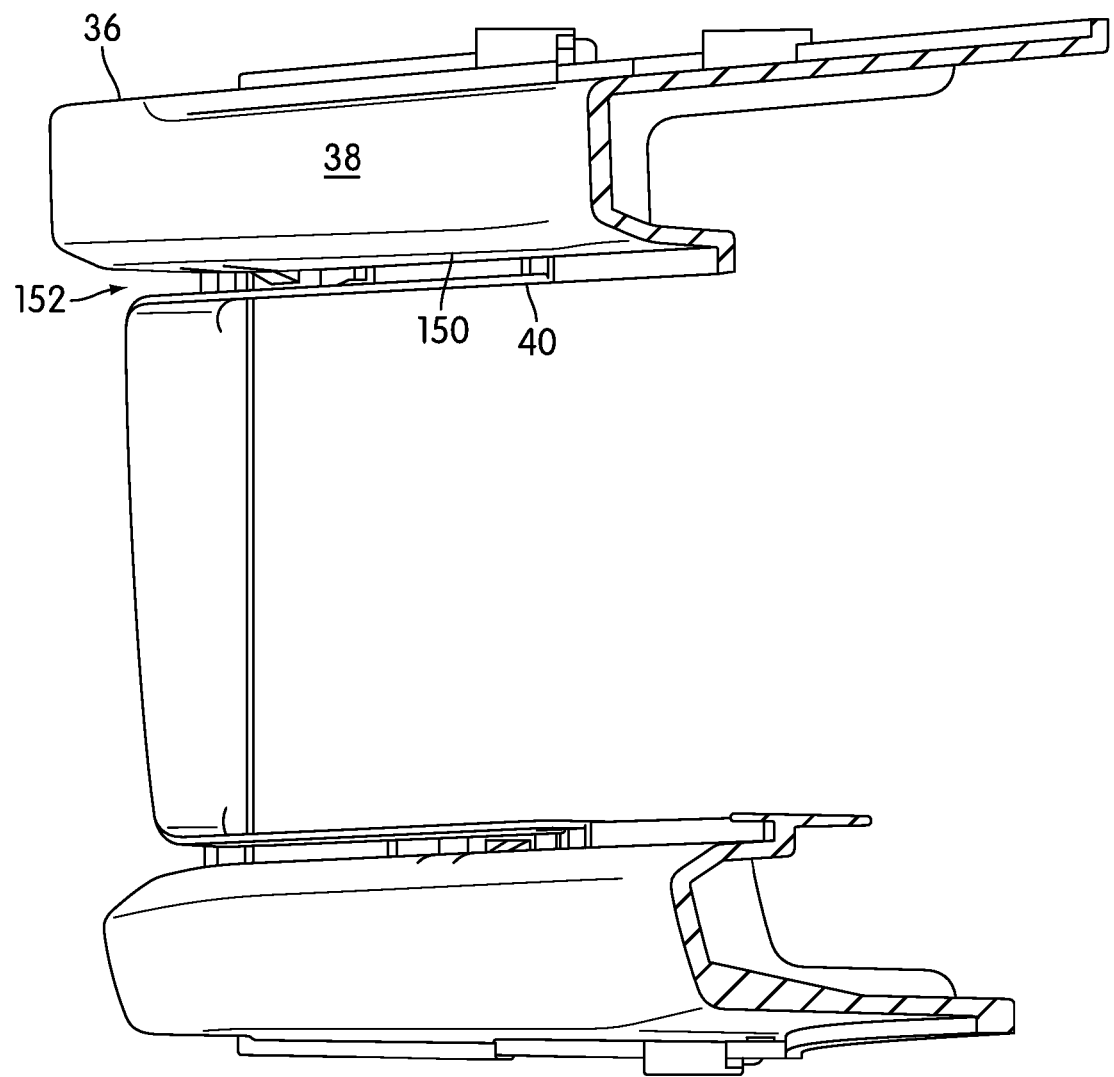
FIG. 12 is a cross-sectional view taken along line 12-12 in FIG. 2.
Figure 13:
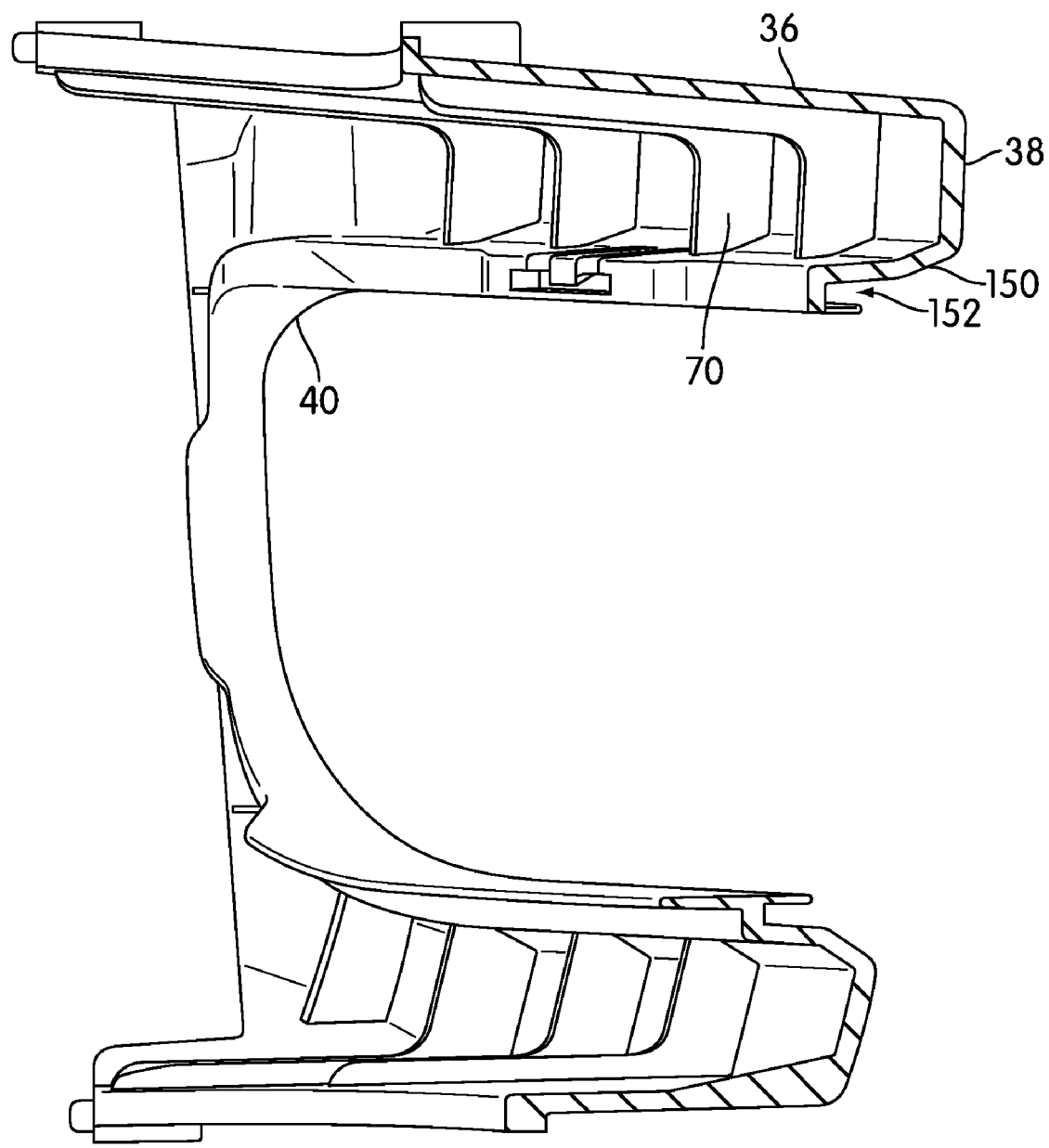
FIG. 13 is a cross-sectional view taken along line 13-13 in FIG. 2.

Referring to FIGS. 11-13, front face 38 of mounting bracket 36 may project forward of bracket aperture 40. Also, centrally facing surface 150 is disposed at an angle to front face 38 and opposes aperture 40. In particular, centrally facing surface 150 may surround bracket aperture 40 in a partial ring-like frame, as clearly illustrated in FIG. 8. As clearly seen in FIG. 13, centrally facing surface 150 and bracket aperture 40 can define mating recess 152 that can receive medial flange 34 and lateral flange 32. With this arrangement, mounting bracket 36 can be configured to mate with medial flange 34 and lateral flange 32.

In different embodiments, the mating geometry of mounting bracket 36 with medial flange 34 and lateral flange 32 can vary. In some embodiments, medial flange 34 and lateral flange 32 can be deep flanges and the shape of mounting bracket 36 can be adjusted so that mating recess 152 is configured to receive deep flanges. In other embodiments, medial flange 34 and lateral flange 32 can be relatively shallow flanges and the corresponding shape of mating recess 152 can be configured to receive shallow flanges. In this exemplary embodiment, the depth of medial flange 34 and lateral flange 32 can be selected to provide a strong mating connection while preventing sinks and deformations in bumper 20 that can occur when using overly deep flanges.

Medial aperture 26 and lateral aperture 28 can include provisions for fixedly associating with a mounting bracket. In some cases, medial aperture 26 and/or lateral aperture 28 can be associated with one or more tabs. In other cases, medial aperture 26 and/or lateral aperture 28 can include one or more screw bosses. In still other cases, medial aperture 26 and/or lateral aperture 28 can include other types of fastening provisions.

Figure 5:
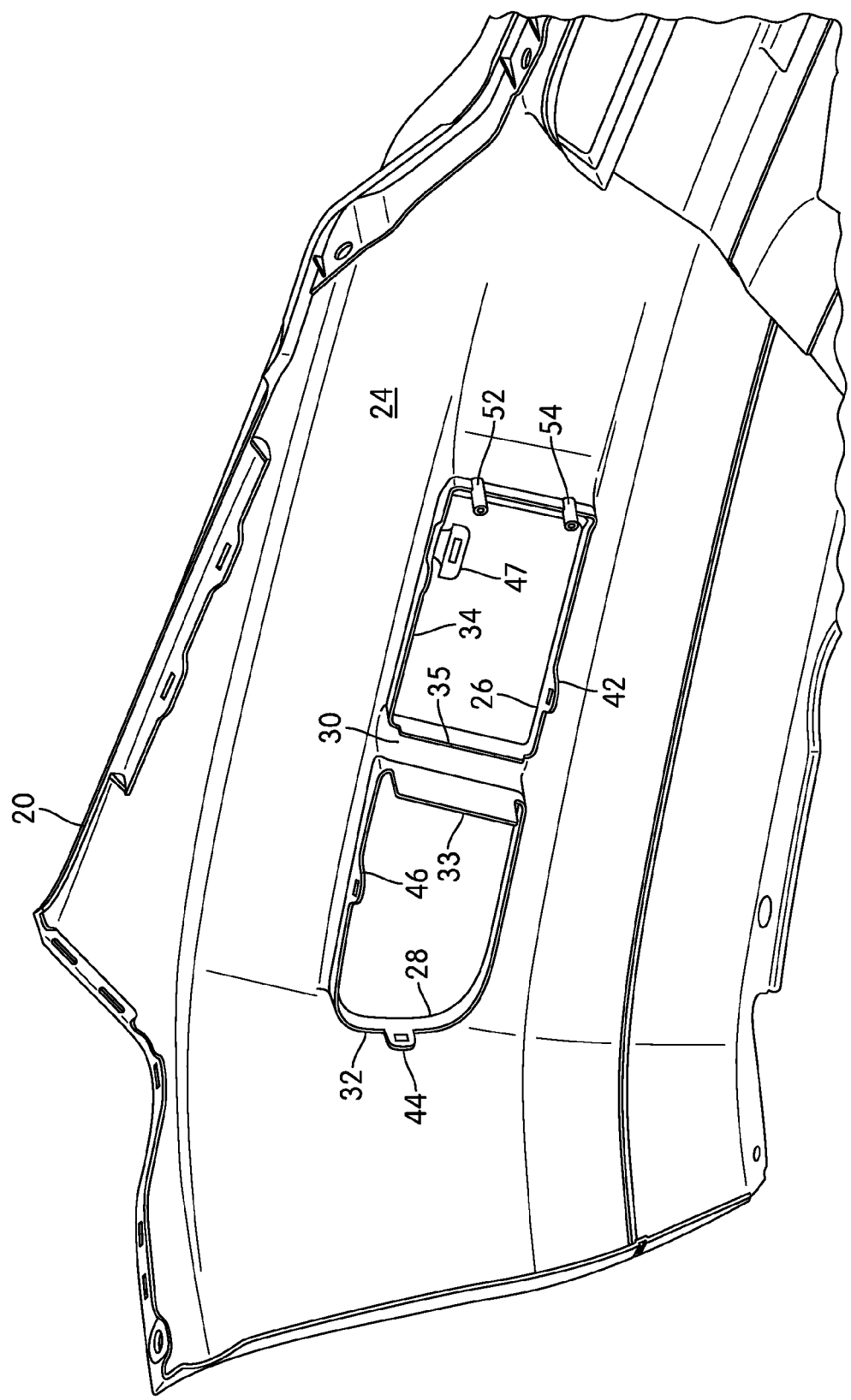
FIG. 5 is a perspective view of a portion of the interior side of the vehicle bumper.
Figure 6:
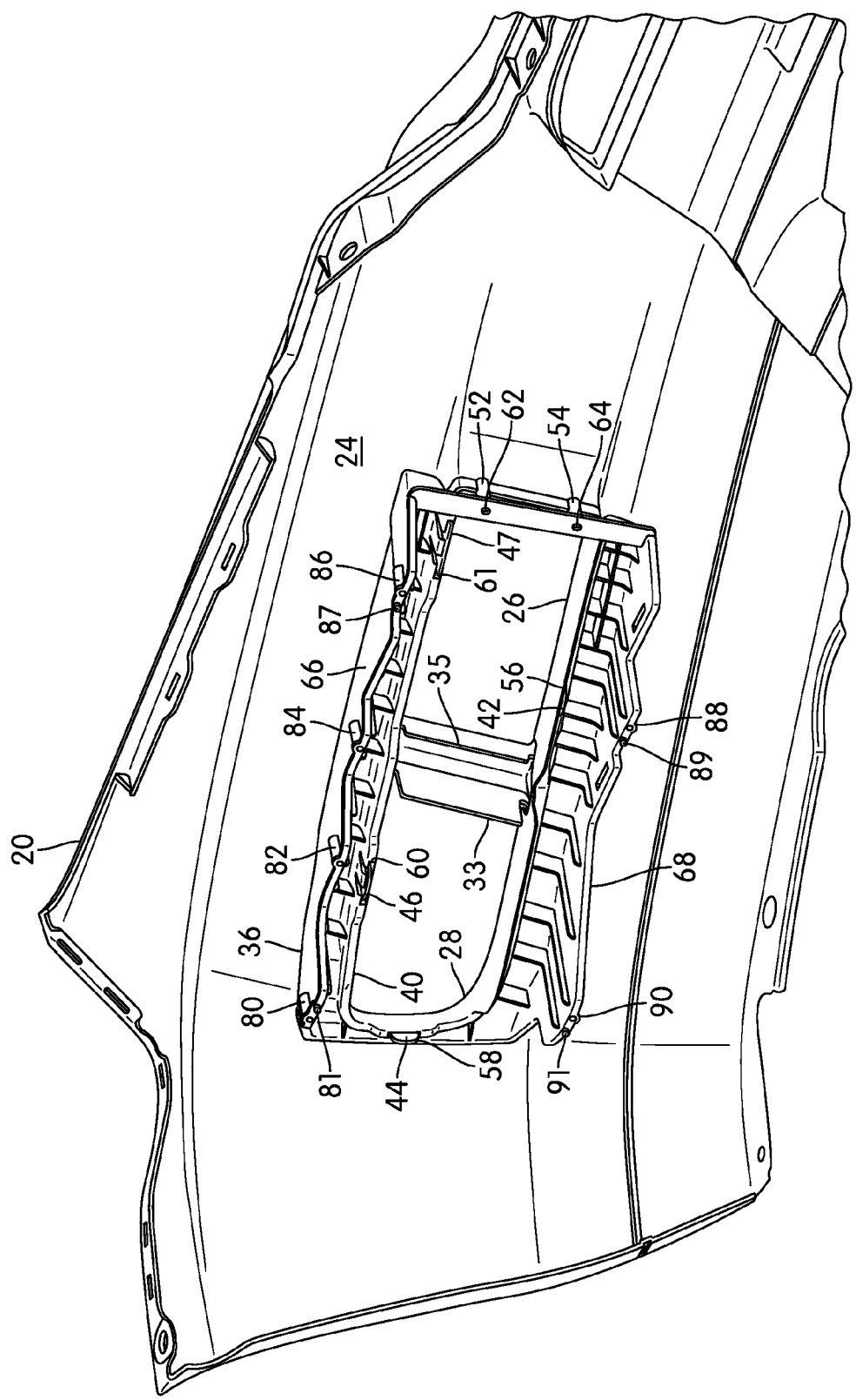
FIG. 6 is a perspective view of a portion of the interior side of the vehicle bumper with the mounting bracket in place.

Referring to FIGS. 4-6, medial aperture 26 can include first medial tab 42 and second medial tab 47 disposed on medial flange 34. Likewise, lateral aperture 28 can include first lateral tab 44 and second lateral tab 46 disposed on lateral flange 32. Using this tab arrangement, mounting bracket 36 can be fixedly connected to bumper 20. In some embodiments, one or more screw bosses can also be provided to ensure a strong connection between bumper 20 and a mounting bracket. In this exemplary embodiment, medial aperture 26 can include first bumper screw boss 52 and second bumper screw boss 54 that are configured to mate with one or more portions of a mounting bracket. In other embodiments, however, a bumper may not include screw bosses.

Mounting bracket 36 can include provisions for fixedly associating with flanges with a bumper. In some cases, mounting bracket 36 can include provisions for receiving one or more tabs disposed on a bumper. In other cases, mounting bracket 36 can include one or more fastening holes that are configured to mate with one or more screw bosses. In this exemplary embodiment, bracket aperture 40 includes first tab lock 56, second tab lock 58, third tab lock 60 and fourth tab lock 61 configured to receive first medial tab 42, first lateral tab 44, second lateral tab 46 and second medial tab 47, respectively. Also, mounting bracket 36 includes first fastening hole 62 and second fastening hole 64 that are configured to attach to first bumper screw boss 52 and second bumper screw boss 54 using two screws.

Mounting bracket 36 can include provisions for attaching to one or more lamps. In some embodiments, a peripheral edge of mounting bracket can be provided with a geometry that facilitates mounting. For example, in some cases, mounting bracket 36 can include ledges that can facilitate mounting. In particular, mounting bracket 36 can include inwardly extending ledges that may extend above and below one or more lamps to hold the weight of the lamps in cantilevered relation to bumper 20.

In this exemplary embodiment, mounting bracket 36 includes top ledge 66 and bottom ledge 68, which extend in a generally rearwards direction. Top ledge 66 and bottom ledge 68 are also clearly illustrated in FIGS. 9 and 10, respectively. In some embodiments, top ledge 66 and bottom ledge 68 can be configured with support ribs 70 that enhance the vertical loading characteristics of top ledge 66 and bottom ledge 68 without substantially increasing the weight or thickness of mounting bracket 36. In other embodiments, however, top ledge 66 and bottom ledge 68 may not include support ribs.

In different embodiments, ledges of a mounting bracket can have different shapes. For example, ledges can include irregular edge shapes, including peaks and valleys, in order to properly fit with and provide appropriate vertical clearance for various types of lamps. In other embodiments, ledges can include regular edge shapes that correspond with one or more lamp shapes. In this exemplary embodiment, top ledge 66 and bottom ledge 68 have edge shapes that are configured to fit with first lamp 48 and second lamp 50.

In some embodiments, top ledge 66 and bottom ledge 68 can include provisions for attaching to one or more lamps. In some cases, top ledge 66 can include one or more fastening holes configured to receive one or more fasteners. In other cases, bottom ledge 68 can include one or more fastening holes configured to receive one or more fasteners. In the exemplary embodiment illustrated in the figures, top ledge 66 and bottom ledge 68 both include multiple screw bosses.

Figure 9:
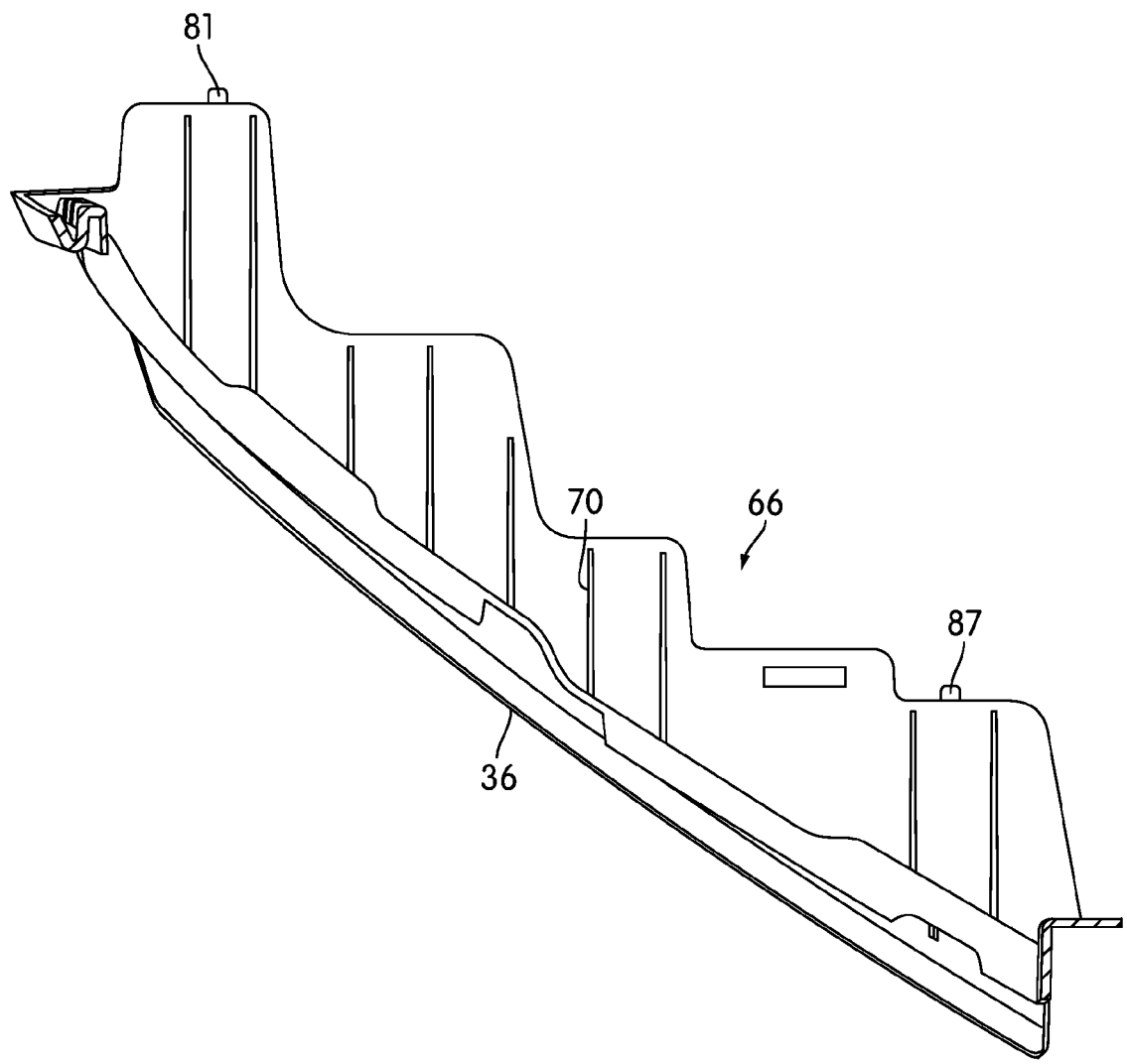
FIG. 9 is a cross-sectional view taken along line 9-9 in FIG. 2.
Figure 10:
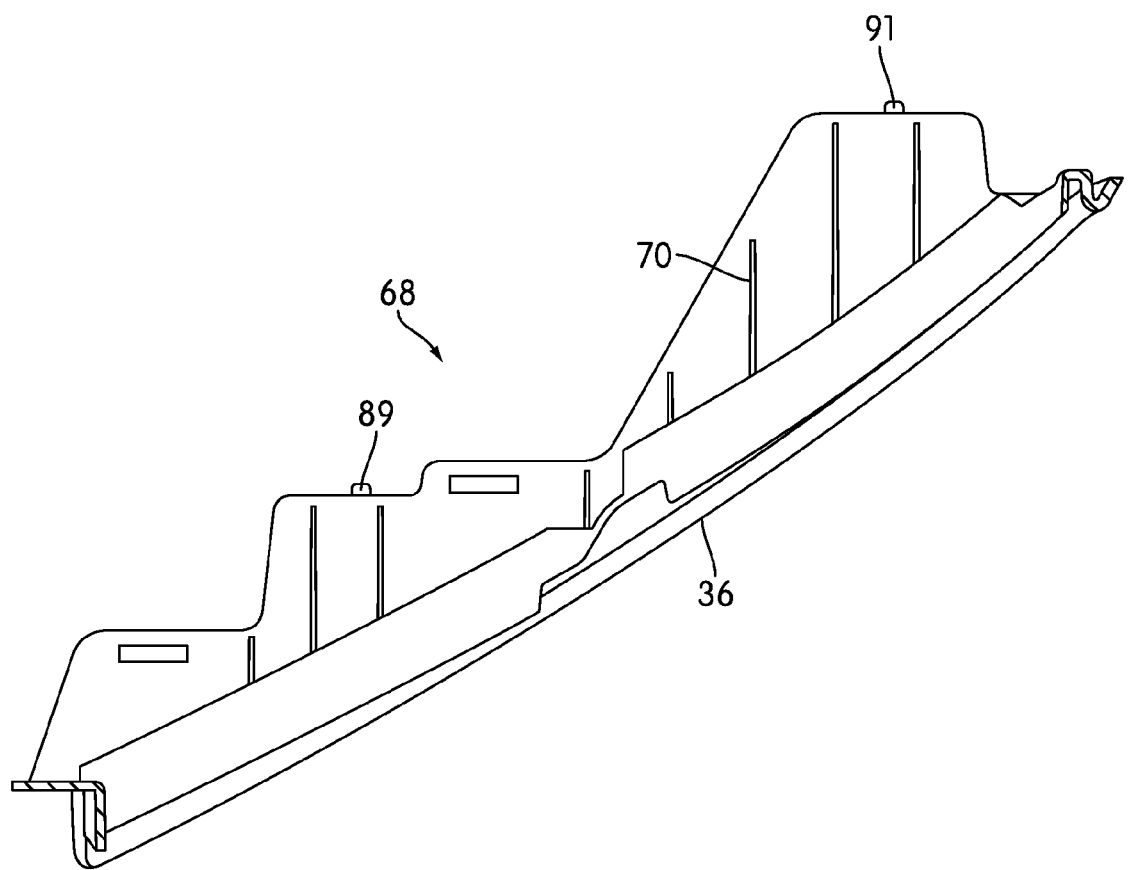
FIG. 10 is a cross-sectional view taken along line 10-10 in FIG. 2.

Referring to FIG. 7, top ledge 66 may include first screw boss 80, second screw boss 82, third screw boss 84 and fourth screw boss 86. Likewise, bottom ledge 68 may include fifth screw boss 88 and sixth screw boss 90. Furthermore, as clearly illustrated in FIG. 7, first screw boss 80, fourth screw boss 86, fifth screw boss 88 and sixth screw boss 90 may be further associated with first alignment projection 81, second alignment projection 87, third alignment projection 89 and fourth alignment projection 91, respectively, which can provide for self-alignment of various screws. FIGS. 9 and 10 also clearly illustrate first alignment projection 81, second alignment projection 87, third alignment projection 89 and fourth alignment projection 91 disposed on top ledge 66 and bottom ledge 68.

In this exemplary embodiment, as clearly illustrated in FIG. 4, first lamp 48 includes first attachment portion 102, second attachment portion 104 and third attachment portion 106 that are associated with first screw 108, second screw 110 and third screw 112, respectively. First screw 108, second screw 110 and third screw 112 can be inserted into third screw boss 84, fourth screw boss 86 and fifth screw boss 88. In some cases, first lamp 48 can also include provisions for associating with one or more screw bosses on bumper 20. In this exemplary embodiment, first lamp 48 can also include fourth screw 114 and fifth screw 116 that are configured to fasten through first fastening hole 62 and second fastening hole 64 and into first bumper screw boss 52 and second bumper screw boss 54. In other embodiments, first lamp 48 can include clips that may attach directly to screw bosses or other provisions in bumper 20.

Second lamp 50 may include fourth attachment portion 130, fifth attachment portion 132 and sixth attachment portion 134 that are associated with sixth screw 136, seventh screw 138 and eighth screw 140. Sixth screw 136, seventh screw 138 and eighth screw 140 can be inserted into first screw boss 80, second screw boss 82 and sixth screw boss 90, respectively.

First lamp 48 and second lamp 50 can also include one or more self alignment features that are configured to associate with one or more alignment projections. In this exemplary embodiment, first lamp 48 and second lamp 50 can include alignment features that are configured to receive first alignment projection 81, second alignment projection 87, third alignment projection 89 and fourth alignment projection 91. This arrangement can help with mounting first lamp 48 and second lamp 50 to mounting bracket 36.

FIG. 6 illustrates a stage of assembly in which mounting bracket 36 has been attached directly to bumper 20 prior to the attachment of any lamps. Mounting bracket 36 may be aligned with medial aperture 26 and lateral aperture 28. In particular, bracket aperture 40 may be aligned just to the inside of medial flange 34 and lateral flange 32. This allows medial flange 34 and lateral flange 32 to insert into mating recess 152 (see FIG. 8) of mounting bracket 36.

Referring to FIG. 6, first lateral tab 44 has been inserted through second tab lock 58. Furthermore, first medial tab 42, second lateral tab 46 and second medial tab 47 have been inserted through first tab lock 56, third tab lock 60 and fourth tab lock 61, respectively. Additionally, first fastening hole 62 and second fastening hole 64 have also been aligned with first bumper screw boss 52 and second bumper screw boss 54.

Using this mounting arrangement, bracket aperture 40 is preferably disposed against medial flange 34 and lateral flange 32. Furthermore, the abutting relationship of front face 38 with interior surface 24 of bumper 20 can facilitate vertical support of mounting bracket 26 and can enhance the weight bearing characteristics of mounting bracket 36 once one or more lamps have been mounted to mounting bracket 36.

Once mounting bracket 36 has been assembled to bumper 20, first lamp 48 and second lamp 50 may be attached to mounting bracket 36. Initially, first lamp 48 is associated with mounting bracket 36, near medial aperture 26. As a lens of first lamp 48 is inserted through bracket aperture 40, first screw 108, second screw 110 and third screw 112 are inserted into fourth screw boss 84, fifth screw boss 86 and sixth screw boss 88. In some cases, alignment features on first attachment portion 102, second attachment portion 104 and mounting bracket 36 can be used to facilitate alignment. Additionally, fourth screw 114 and fifth screw 116 may be inserted through first fastening hole 62 and second fastening hole 64 and further engage first bumper screw boss 52 and second bumper screw boss 54.

Once first lamp 48 has been assembled with mounting bracket 36, second lamp 50 can be attached. As a lens of second lamp 50 is inserted through bracket aperture 40, sixth screw 136, seventh screw 138 and eighth screw 140 can be inserted into first screw boss 80, second screw boss 82 and sixth screw boss 90. In some cases, alignment features on fourth attachment portion 130 and sixth attachment portion 134 and mounting bracket 36 can be used to facilitate alignment.

Generally, any type of fasteners could be used with mounting bracket 36. Although the exemplary embodiment uses screws to connect mounting bracket 36, in other embodiments different types of fasteners could be used. In some cases, one or more clips could be used. In a exemplary embodiment, self-tapping screws could be used.

In some embodiments, a material for making a mounting bracket can be selected according to the rigidity of a bumper. In some cases, a mounting bracket can be made of a material that is more rigid than a material used to make the bumper. In other cases, a mounting bracket could be less rigid than a material used to make the bumper. In a exemplary embodiment, a mounting bracket could be made of a material that is 50-55% stiffer than the material used for the bumper. By using a substantially more rigid material for the mounting bracket, the overall stability of the mounting system can be maintained.

Generally, any materials known in the art can be used to achieve the desired rigidity for a mounting bracket. In some embodiments, a composite material can be used. For example, in one embodiment, a mounting bracket could be made of a 20% polypropene glass filled fiber.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A vehicle bumper assembly comprising:
   a resilient bumper adapted to be attached to a vehicle body, said bumper having a bumper exterior surface and a bumper interior surface and a bumper aperture for a lamp, said bumper aperture formed integrally with and defined by a peripheral flange including a bumper screw boss formed thereon and an inwardly directed tab;
   a mounting bracket configured to be mounted to the bumper from an interior side of the bumper, the mounting bracket having a bracket exterior surface configured to abut and mate with said bumper interior surface, a bracket aperture aligned with said bumper aperture and presenting a ring-like frame for mounting the lamp in cantilever relation, said bracket having a screw aperture disposed to align with said bumper screw boss on said bumper, and a resilient tab lock disposed to align with and matingly receive said tab, said bracket also comprising opposed integrally formed ledges extending inward, and a plurality of bracket screw bosses disposed along said ledges for mounting the lamp thereto.

2. The vehicle bumper assembly according to claim 1, wherein a center column divides the bumper aperture into a medial aperture and a lateral aperture.

3. The vehicle bumper assembly according to claim 1, wherein the mounting bracket includes at least one self-alignment feature that is configured to facilitate mounting the lamp to the mounting bracket.

4. The vehicle bumper assembly according to claim 1, wherein the ledges include a plurality of support ribs.

5. The vehicular bumper assembly according to claim 1, wherein the ledges have a shape corresponding to the shape of the lamp.

6. The vehicular bumper assembly according to claim 1, wherein the mounting bracket includes a plurality of self-aligning features.

7. A vehicle bumper assembly comprising:
a resilient bumper adapted to be attached to a vehicle body, said bumper having a bumper exterior surface and a bumper interior surface and a bumper aperture for a lamp, said bumper aperture formed integrally with and defined by a peripheral flange including a screw boss formed thereon and an inwardly directed tab;
a mounting bracket for mounting said lamp, the mounting bracket being configured to be mounted to the bumper from an interior side of the bumper, the mounting bracket having a bracket exterior surface configured to abut and mate with said bumper interior surface, said mounting bracket including a front face and an inward facing surface that is disposed at an angle to the front face;
said mounting bracket further including a bracket aperture that is disposed adjacent to the inward facing surface and a mating recess disposed between the bracket aperture and the inward facing surface; and
wherein the peripheral flange is configured to insert into the mating recess and thereby mate the mounting bracket with the bumper.

8. The vehicle bumper assembly according to claim 7, wherein the mounting bracket is stiffer than the bumper.

9. The vehicle bumper assembly according to claim 8, wherein the mounting bracket is approximately 50 to 55 percent stiffer than the bumper.

10. The vehicle bumper assembly according to claim 7, wherein the mounting bracket comprises comprising opposed integrally formed ledges extending inward.

11. The vehicle bumper assembly according to claim 10, wherein a plurality of screw bosses are disposed along the ledges for mounting the lamp.

12. The vehicle bumper assembly according to claim 7, wherein the mounting bracket is configured to hold the lamp in cantilever relation to the bumper.

13. The vehicle bumper assembly according to claim 11, wherein the plurality of screw bosses are associated with at least one alignment projection configured to engage an alignment feature on the lamp.

14. A vehicle bumper assembly comprising:
a resilient bumper adapted to be attached to a vehicle body, said bumper having a bumper exterior surface and a bumper interior surface and a bumper aperture for a lamp, said bumper aperture formed integrally with and defined by peripheral flange;
a mounting bracket configured to be mounted to the bumper from an interior side of the bumper, the mounting bracket having a bracket exterior surface configured to abut and mate with said bumper interior surface, a bracket aperture aligned with said bumper aperture and presenting a ring-like frame for mounting the lamp in cantilever relation;
said bracket also comprising opposed integrally formed ledges extending inward; and
wherein the lamp is configured to mount to the ledges.

15. The vehicle bumper assembly according to claim 14, wherein the flange includes at least one tab.

16. The vehicle bumper assembly according to claim 15, wherein the mounting bracket includes at least one resilient tab lock that is configured to receive the at least one tab.

17. The vehicle bumper assembly according to claim 14, wherein the mounting bracket includes at least one screw boss that is configured to receive a screw for fastening to the lamp.

18. The vehicle bumper assembly according to claim 17, wherein the at least one screw boss is disposed on the ledges.

19. The vehicle bumper assembly according to claim 18, wherein the ledges include six screw bosses.

20. The vehicle bumper assembly according to claim 18, wherein the ledges include four alignment projections.

* * * * *